Patented Dec. 16, 1947

2,432,891

UNITED STATES PATENT OFFICE 2,432,891

SILICON CONTAINING RESINS AND METHOD OF PRODUCING SAME

Laurence R. B. Hervey, Concord, Mass., assignor to Arthur D. Little, Inc., a corporation of Massachusetts No Drawing. Application March 9, 1943, Serial No. 478,543

10 Claims. (Cl. 260—46.5)

This invention which is a continuation-in-part of my application S. N. 394,325, filed May 20, 1941, relates to the preparation of polycondensation products from organic silicon compounds, and to the products thus prepared.

It is already known that di- and trichlorsilanes, upon hydrolysis, yield substances of higher molecular weights than those of the starting materials. These substances are usually of an oily or resinous nature. While the mechanism of this reaction has not been fully explained, it is generally believed to proceed by the following steps, wherein ethyl trichlorsilane is given as a typical and illustrative chlorsilane:

(1) $C_2H_5SiCl_3 + 3H_2O \rightarrow C_2H_5Si(OH)_3 + 3HCl$ (2) $2nC_2H_5Si(OH)_3 \rightarrow [(C_2H_5Si)_2O_3]_n + 3nH_2O$ The ethyl trihydroxysilane (ethyl silico-triol) produced by hydrolysis in accordance with Equation 1, is unstable, and it loses water and condenses, as shown in Equation 2, to form various condensation and polycondensation products, which are indicated by the general formula $[(C_2H_5Si)_2O_3]_n$ in Equation 2. This condensation reaction may be carried out under various conditions, and the resulting products may be oils, soft sticky solids, hard solids, or pseudo crystalline insoluble and infusible powders, depending upon these conditions. The exact structural formulas for these several products have not been established, although a number of different types of formulas may be written for them.

The present invention is particularly concerned with the preparation of such polycondensation products by carrying out the hydrolysis and condensation in the presence of a suitable solvent or vehicle and with the use of enough water to effect hydrolysis, avoiding any great excess of water. Such procedure results in the production of solutions or suspensions of the condensation and polycondensation products, which products set up to solid substances of various degrees of hardness upon evaporation of the solvent or vehicle.

On examining these solid products so produced by known processes, I find that they are unstable when exposed to elevated temperatures, for example, temperatures around 200–250° C. These solid products whether as films, coatings, cast bodies, or in other shapes or forms, undergo a considerable loss in weight at such elevated temperatures, and at the same time they crack severely and frequently break up entirely into a powdery or crumbly mass. This disintegration occurs to a considerable extent even at ordinary temperatures, although much more slowly.

It might at first be concluded that the water formed according to Equation 2 continues to form and evaporate as the solid condensation product is heated at elevated temperatures, and that the shrinking, disintegration, and loss in weight of the product are due to evaporation of this water. I have found, however, that this is not the explanation of the unsatisfactory properties of these silicon products.

On examining the material volatilized from these products, I find that it consists principally of a low-molecular-weight condensation product of the formula $(C_2H_5Si)_4O_6$, i. e. where $n=2$ in the principal product of Equation 2. This tetramer, i. e. the condensation product having four atoms of silicon, has a molecular weight of 324, and a boiling point, at reduced pressure, well below the point where it decomposes, whereas the desired silicon polycondensation products have molecular weights in the order of 1000 to 2000 or higher and decompose before their boiling points are reached.

The detailed explanation of the equations involved in the formation of the tetramer and like by-products in this reaction is not known. However, it may be said in general that, as the reaction of Equation 2 proceeds, in the presence of a suitable solvent or vehicle, molecules of water are lost from adjacent molecules of the trihydroxysilane (silico-triol) and these latter molecules condense, and this condensation proceeds, in the case of the major part of the reactants, to produce a solution of a mixture of suitable polycondensation products of high molecular weight of the order of at least 1000. But in the case of a minor portion of the reactants, the condensation proceeds to form a blocked or closed system—e. g. the tetramers already referred to—wherein there are no more reactive —OH groups and condensation can proceed no further under the conditions of Equation 2. These latter products have relatively lower molecular weights, in the order of under 500.

The present invention is therefore directed to the preparation, in the form of solutions or lacquers or the like, of the desired high-molecular-weight silicon polycondensation products which are substantially free from tetramers or other low-molecular-weight products volatile at elevated temperatures, e. g. up to about 300° C., and to the preparation of solidified films, coatings, cast or shaped bodies or the like from such solutions or lacquers. These results are obtained by eliminating from the polycondensation product the undesired tetramers and like by-products by employing a catalyst, namely sulfuric acid, to cause them to combine into suitable higher polycondensation products.

It may, therefore, be stated generally that this invention provides methods for effectively controlling the conditions and products of the reaction of Equation 2. It follows that such methods are essentially independent of the method by which the hydroxysilanes are formed, i. e. whether by the reaction of Equation 1 or by other reactions. One example of such other reactions is the hydrolysis of orthoesters, e. g. ethyl triethoxysilane:

(3) 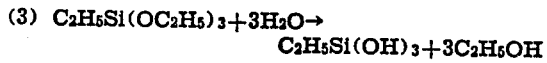
$$C_2H_5Si(OC_2H_5)_3 + 3H_2O \rightarrow C_2H_5Si(OH)_3 + 3C_2H_5OH$$

Another is the acidification of salts, such as potassium trisilico-propionate:

(4) 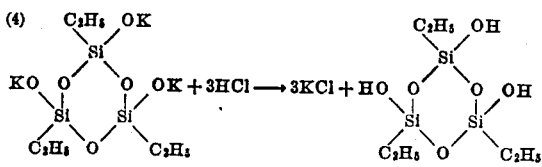

Still another is the hydrolysis of the trichlor compound with alkali:

(5) $C_2H_5SiCl_3 + 3KOH \rightarrow C_2H_5Si(OH)_3 + 3KCl$

The invention will now be described in greater detail in the following examples, which are to be considered as illustrative rather than limiting.

Example I

Ethyl triethoxysilane is first prepared by reacting one mol (163.5 grams) of ethyl trichlorsilane with about 6 mols (350 cc.) of absolute ethyl alcohol (100% excess of theory). The alcohol must be anhydrous. The product is distilled and the cut boiling between 158 and 160° C. is used for the subsequent treatment. To one mol of this resulting product (ethyl triethoxysilane) three mols of water are added, to hydrolyze all the ethoxy groups to hydroxyls. At first the mixture is two-phase; then reaction starts and the mixture warms up and becomes one-phase. A suitable solvent such as dibutyl ether may be added at this stage, and the mixture refluxed, although such procedure may be omitted if desired. In either procedure, water is first taken up to give ethyl trihydroxysilane (ethyl silico-triol) in accordance with Equation 3, and then water is eliminated and condensation takes place, as shown in Equation 2.

If refluxing is carried out, water is preferably eliminated from the reflux condensate before returning the latter to the solution being refluxed.

The resulting solution may be sheeted out as a film or other shape and the solvent or vehicle removed by evaporation.

Films or the like so prepared undergo considerable loss in weight and strength, and crack severely, when subjected to high temperatures, as indicated in the table at the end of this example. This result is, as already stated, due to volatilization of the relatively low molecular weight condensation products. In order to prevent this loss, and to produce a stable product, there is added to the solution as prepared above, about 1% of concentrated sulfuric acid based on the weight of the original ethyl triethoxysilane, and refluxing is carried out (or continued, if already under way) with the elimination of water. Refluxing is continued until the desired viscosity is attained, generally just short of the point at which gelation occurs or the insoluble polycondensation products begin to form and separate.

This refluxing must be watched carefully for viscosity changes; if it is carried too far, insoluble materials will form. When the desired viscosity is reached the heating is stopped. The solution may then be used for various purposes such as surface coating or casting films, or may be evaporated to give a bulk resin. The films are stable at 200° C., and even higher.

The following table shows the remarkable effect of sulfuric acid as a catalyst in promoting the formation of a heat-stable resin.

|  | Resin condensed without sulfuric acid | Resin condensed with sulfuric acid |
| --- | --- | --- |
| Loss in weight of resin after 43 hrs. at 195° C. | 22.7% | 2.1%. |
| Condition of resin after heating | crumbly powder | clear film. |

Instead of going through intermediate products as shown in Example I, the chlorsilane may be hydrolyzed directly, if desired, in accordance with Equation 1. As a rule, however, better control over the reaction and greater uniformity of results are obtained if an intermediate product is formed, as shown in Example I.

In place of dibutyl ether, other solvents, such as toluol, may be used. Other alcohols, such as methyl, may be used in place of ethyl alcohol; they must, however, be anhydrous when the procedure of Example I is followed.

Other chlorsilanes may be used in place of ethyl trichlorsilanes but the quality of the finished resin depends on the chlorsilane used. Monochlorsilanes are not useful in this process, except as they may be employed to modify the consistency of the final resin, as the monohydroxy silanes will not condense beyond the dimer stage. Dichlorsilanes generaly give liquids or soft resins. These may be valuable as modifiers of the harder resins but are generally too soft to be used alone where self-sustaining sheets or shapes are desired.

Other organic di- or trichlorsilanes may be used than the ethyl compound already referred to. For example, other alkyl di- or trichlorsilanes such as amyl may be used, and aryl or aralkyl di- or trichlorsilanes such as the phenyl or benzyl compounds respectively may be employed.

Furthermore, the halogen may be bromine or iodine instead of chlorine, and the silane compounds employed may therefore be bromo- or iodosilanes instead of the chlorsilanes referred to above.

The chlorsilanes referred to in Equation 1 may therefore be broadly represented by the formula $R_xSiX_{4-x}$ and the hydroxysilanes (silicols) of Equations 1 and 2 by $R_xSi(OH)_{4-x}$, R representing an alkyl, aralkyl or aryl group, X representing chlorine, bromine, or iodine, and $x$ representing 1 or 2. Hence the polycondensation products made in accordance with Equation 2 may be broadly represented by the formula $$[(R_xSi)_2O_{4-x}]_n$$

Furthermore, the chlorsilanes or other starting materials, the hydroxysilanes, and the products may be mixtures of the di- and trisilane compounds, in appropriate amounts; it is not necessary that they be either di- or tri-compound, exclusively. Therefore, in the final polycondensation product $x$ may represent any numerical value between 1 and 2 inclusive. And where mixtures of the di- and tri- compounds are used, as in plasticizing the latter by means of the former as already referred to, $x$ will be greater than 1 but less than 2.

Example II

The preparation of a polycondensation product of a mixed silane diol and silane triol, starting with methyl bromide and silicon tetrachloride and using the Grignard reaction, may be carried out as follows:

| | |
|---|---|
| Methyl bromide | 200.0 gms. (2.1 mols) |
| Magnesium | 51.1 gms. (2.1 mols) |
| Ethyl ether (anhydrous) | 1000.0 cc. |
| Silicon tetrachloride | 205 gms. (1.2 mols) |

The magnesium is placed in a three-necked flask fitted with a stirrer, reflux condenser and dropping funnel, and is covered with 300 cc. of ether. The methyl bromide, contained in a sealed vial, is chilled in an ice-salt mixture, and is then added to 300 cc. of anhydrous ether similarly chilled. This ether solution of methyl bromide is next added dropwise to the magnesium after first starting the reaction with one crystal of iodine. The temperature of the reaction mixture is maintained at 75–80° F. by means of a water bath in which the reaction flask is partly immersed. After all the methyl bromide has been added, the reaction mixture is stirred for one hour to complete the reaction. The Grignard reagent thus prepared is filtered through glass wool into a flask which is then tightly stoppered.

The reaction flask is then cleaned, the reflux condenser replaced with a thermometer, and the water bath surrounding it replaced with a bath of dry ice and acetone.

Then the silicon tetrachloride, dissolved in 400 cc. of anhydrous ether, is added to the reaction flask and cooled to −20° C. The Grignard reagent prepared as described above is added dropwise to the silicon tetrachloride-ether mixture at such a rate that the temperature of the reaction mass does not rise above −20° C. When all of the Grignard reagent has been added, the reaction mixture was poured in a thin stream over cracked ice contained in a large glass funnel, thus hydrolyzing the methyl silicon chlorides (principally mono- and dimethyl) formed by the Grignard reaction. The effluent from the funnel is received in a beaker containing cracked ice. The ether layer is separated and the ether removed in vacuo at a temperature not greater than 50° C. Yield of product is 71.5 gms.

A small portion of the product is dissolved in dibutyl ether (20% solution) and a portion of this solution evaporated in an aluminum dish. The dish containing the resin film is then heated at successively higher temperatures to determine its heat stability. Concurrently with this heat stability test, a similar test is conducted on another portion of the resin which has been refluxed in dibutyl ether for 2 hrs. with 0.5% of sulfuric acid based on the resin content of the solution. The stability data in terms of the weight loss, appearance and character of the film are given below:

While refluxing with sulfuric acid is generally preferred, it may, if desired, be omitted and the sulfuric acid merely added without further treatment of the product. However, refluxing produces a more viscous solution and results in a less tacky film.

It will be noted that no effort is made to remove sulfuric acid from the polycondensation products and articles prepared as described above. Ordinarily, the inclusion of sulfuric acid in resinous products is strictly avoided, due to the deleterious effects of this acid in decomposing such products or in attacking the articles with which they come in contact, or in other ways. I have found, however, that such deleterious effects are not manifested by the products prepared in accordance with the present invention; in fact, removal of more or less of the acid, as by washing, during any of the stages of condensation, results in a poorer product resembling products of this type made without the use of sulfuric acid as a catalyst.

The amount of sulfuric acid used as a catalyst in the procedure of the present invention depends upon various conditions such as the nature of the silicon compounds being reacted and the length of time desired for condensation to take place in presence of the sulfuric acid. In general, however, the amount of sulfuric acid used should be less than about 5% based on the weight of the final solid polycondensation product, and will preferably be from about 3% down to about 0.1%, depending upon conditions and components as already stated.

In carrying out the condensation reaction in the presence of the sulfuric acid catalyst which causes elimination of low-molecular-weight products, as described in Examples I and II, the reaction should, as already indicated, be stopped just short of gelation, so that the resin will not set up in the reaction vessel. At the gelation point, the resin has reached a stage where it is no longer soluble in the solvent, and hence can not conveniently be applied as a coating or cast into films or otherwise worked up into various products. At this gelation point the resin is in an irreversible stage with respect to its solubility characteristics, i. e. it will not redisperse in any amount of added solvent. Approach to incipient gelation can be observed by noting the increase in viscosity of the product, and with a little practice a suitable limiting upper viscosity can be established for each type of resin. If desired, the refluxing may be stopped when the viscosity of the reaction mixture has increased appreciably above its original amount and a small sample of the mixture may be removed and refluxed until gelation occurs, thereby indicating the amount

| | Untreated Resin | Resin refluxed with Sulfuric acid |
|---|---|---|
| Weight and appearance of film after drying at 53° C | 0.1430 gm. (viscous syrup) | 0.1262 gm. (tack-free glossy film). |
| Weight and appearance after drying for 24 hrs. at 100° C | 0.0942 gm. (tack free glossy film) | 0.1192 gm. (no change). |
| After drying 24 hrs. more, at 100° C | 0.0924 gm. (no change) | 0.1188 gm. (no change). |
| After drying 2 hrs. more, at 155° C | 0.0902 gm. (no change) | 0.1171 gm. (no change). |
| After drying 42 hrs. more, at 197° C | 0.0867 gm. (badly cracked) | 0.1121 gm. (no change). |
| After drying 24 hrs. more at 197° C | 0.0866 gm. (badly cracked) | 0.1119 gm. (no change). |
| Total weight loss in per cent | 39.5 | 11.3. |

It will thus be apparent that the resin prepared as above wherein the step of refluxing with sulfuric acid is omitted, is not stable when heated to 197° C., as it loses weight, becomes brittle and cracks badly. On the other hand, the sulfuric acid condensed resin loses very little weight and even after heating at 197° C. still has slightly rubbery properties.

of further refluxing necessary for the main bulk of the mixture. A test which may most easily be made when the interior of the reaction vessel is observable is to watch for any tendency for the resin to set up, out of the solution, against the heated wall of the vessel. As soon as the first sign of such setting appears, the refluxing should be stopped, as the condensation has proceeded sufficiently close to the point where gelation occurs.

The products of the present invention may be modified in various ways to suit the particular uses to which they are put. For example, compatible plasticizers may be added to the solutions of the polycondensation products of this invention, so that the flexibility of the films, coatings and the like made therefrom will be increased. Even without plasticizers, however, films and coatings made from polycondensation products of this invention have sufficient flexibility for many purposes.

Another method of modification is to cause cocondensation between the silicon-containing products of this invention, at some stage in their condensation, and other substances which are capable of condensing or polymerizing with these silicon-containing products, thus forming mixed silicon resins.

The polycondensation products of this invention have been referred to herein both as their liquid solutions or suspensions and as solid final products obtained on removal of all or at least a sufficiently large amount of the liquid phase. The liquid solutions or suspensions may contain as much as 25% of the polycondensation products by weight, and are useful as lacquers or coating compositions. For such uses they may be diluted if desired, or otherwise modified, and brought to a suitable consistency for application by brushing, spraying, dipping, or otherwise; application may be made to metal, wood, stone, paper, or other surfaces, which surfaces may have been previously prepared for reception of the coating if necessary. These lacquers may, for example, be applied without modification (other than regulating the viscosity appropriately to the method of application) to clean iron surfaces, and the resulting coating, after drying and baking, adheres firmly. Several coats may be thus applied.

The liquid products are also suitable for the formation of sheets, films, and other self-sustaining shapes, or they may be cast if desired to form blocks or other solid articles, as is usual in resin technique. In such procedure, the solvent evaporates, partly or wholly as necessary, and the polycondensation product remains as the solid sheet, film, block, or other form.

The final polycondensation products of this invention, in their final solid state, are particularly useful where heat stability is required. These products remain stable at temperatures in the order of 250° C., and even at 300° C. they do not char or burn although they crack or break up, with some loss in weight. At the latter temperature, ordinary organic synthetic resins are either badly charred and decomposed or even completely destroyed, and in some cases they or their vapors ignite readily at such temperatures if a flame or spark is near. On the other hand, when the solid resinous products of the present invention are heated sufficiently high to lose their organic components by volatilization or oxidation, there is left behind a silica ($SiO_2$) structure which amounts to anywhere from about 90% (in the case of the methyl compound) down to about 40% (in the case of the higher alkyl or the aryl compounds produced) of the weight of the original resinous product. These amounts correspond to 42% and 19%, respectively, of silicon (Si) in the original resinous product.

In addition to their use as sheets or other shapes, or as coating materials, as already suggested, the solutions or suspensions of the polycondensation products may be used as adhesives for various purposes such as the lamination of sheets of mica. The solidified polycondensation products exhibit high dielectric strength, thus serving as particularly valuable materials in electrical insulation either as sheets alone or laminated as with mica. The solutions or suspensions may also be used as lacquers for application to wires which are to be used at elevated temperatures, for example, in winding electric motors, and as impregnants for insulating tapes, particularly tapes made of glass fibers.

I claim:

1. The method of preparing stable silicon-containing poly-condensation products which comprises hydrolyzing a mixture of completely substituted silanes, said mixture of silanes having a molar R to silicon ratio of between one and two and containing as their only substitution R groups and readily hydrolyzable groups, to yield a silicol as the hydrolysis product, said silanes being principally composed of mixtures of silanes capable of reacting with water to yield as intermediates $R_2Si(OH)_2$ and $RSi(OH)_3$ wherein each R is identical and is selected from the group consisting of alkyl, aryl, and aralkyl, adding a solvent to the silicol, and adding from 0.1% to 1% by weight of concentrated sulfuric acid as a catalyst for the condensation, said solvent being capable of forming a homogeneous solution with the catalyst and condensation product, said solvent having a boiling point below that of sulfuric acid and being a non-solvent for water, maintaining said sulfuric acid in the solution while applying heat and removing water by distillation, returning the distilled solvent, and retaining said sulfuric acid in the final condensation product.

2. A silicon-containing poly-condensation product obtained by baking to the solid state the product obtained by the method of claim 1.

3. The method of preparing a stable silicon-containing poly-condensation product which comprises hydrolyzing a completely substituted silane, said silane containing as its only substitution one to two R groups and two to three readily hydrolyzable groups to yield a silicol as the hydrolysis product, said silane being capable of reacting with water to yield as an intermediate $R_xSi(OH)_{4-x}$ wherein R is selected from the group consisting of alkyl, aryl, and aralkyl, and $x$ is a positive whole number from 1 to 2, adding a solvent to the silicol, and adding from 0.1% to 1% by weight of concentrated sulfuric acid as a catalyst for the condensation, said solvent being capable of forming a homogeneous solution with the catalyst and condensation product, said solvent having a boiling point below that of sulfuric acid and being a non-solvent for water, maintaining said sulfuric acid in the solution while applying heat and removing water by distillation, returning the distilled solvent, and retaining said sulfuric acid in the final condensation product.

4. A silicon-containing poly-condensation product obtained by baking to the solid state the product obtained by the method of claim 3.

5. An article of manufacture comprising a silicon-containing poly-condensation product obtained by baking to the solid state on an iron surface the product obtained by the method of claim 3.

6. The method according to claim 3 wherein the silane is one capable of reacting with water to yield as an intermediate $R_2Si(OH)_2$.

7. A silicon-containing poly-condensation product obtained by baking to the solid state the product obtained by the method of claim 6.

8. The method according to claim 3 wherein the silane is one capable of reacting with water to yield as an intermediate $RSi(OH)_3$.

9. A silicon-containing poly-condensation product obtained by baking to the solid state the product obtained by the method of claim 8.

10. The method of preparing new synthetic compositions which comprises hydrolyzing an alkyl trialkoxysilane, heating to cause condensation of the resulting hydrolysate, in the presence of a solvent, said solvent being a solvent for the resulting condensation product and for concentrated sulfuric acid, and also being a non-solvent for water, and having a boiling point less than that of sulfuric acid, eliminating the low molecular weight silicon-containing by-products by the addition of concentrated sulfuric acid in an amount of from 0.1% to 1% by weight to cause their further condensation in the presence of heat, and continuing the heating under reflux conditions and with elimination of water from the reaction mixture while retaining sulfuric acid therein until the resulting solution of polycondensation products is in a state of incipient gelation, and then cooling the said solution and retaining said sulfuric acid in the resulting products.

LAURENCE R. B. HERVEY.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,371,068 | Rochow | Mar. 6, 1945 |
| 2,371,050 | Hyde | Mar. 6, 1945 |

OTHER REFERENCES

Rochow, Chemistry of the Silicones, Wiley, 1946, pages 34 and 35.

Koton, J. Applied Chem. U. S. S. R., vol. 12, pages 1435–9 (1939), as abstracted in Chemical Abstracts pages 6242–3 (1940).

Kipping, Proc. Royal Soc. London, vol. A, 159, 1937, page 142.

Rochow, Journ. Amer. Chem. Soc., vol. 63, pages 798 to 800 (March, 1941).

Martin et al., J. Chem. Soc. (London), vol. 95, 1909, page 313.

Robison, Tr. J. Chem. Soc. (London), vol. 105, 1914, pages 40 to 47.

Cusa, Proc. J. Chem. Soc. (London), 1932, pages 2205 to 2209.

Andrianov, Org. Chem. Ind. (U. S. S. R.), vol. 6, pages 203–8 (1939); Chem. Abstr., vol. 34, pages 2096–7.